United States Patent [19]
Auyeung et al.

[11] Patent Number: 5,619,341
[45] Date of Patent: Apr. 8, 1997

[54] METHOD AND APPARATUS FOR PREVENTING OVERFLOW AND UNDERFLOW OF AN ENCODER BUFFER IN A VIDEO COMPRESSION SYSTEM

[75] Inventors: Cheung Auyeung, Hoffman Estates; Brett L. Lindsley, Algonquin; Stephen N. Levine, Itasca, all of Ill.

[73] Assignee: Motorola, Inc., Schaumburg, Ill.

[21] Appl. No.: 392,583

[22] Filed: Feb. 23, 1995

[51] Int. Cl.$^6$ .................................................. H04N 1/00
[52] U.S. Cl. ........................................... 358/404; 348/419
[58] Field of Search ................................... 348/419, 390, 348/384; 382/239; 358/404, 426, 261.1–261.4, 428–430

[56] References Cited

U.S. PATENT DOCUMENTS

| | | | |
|---|---|---|---|
| 4,907,081 | 3/1990 | Okamura et al. | 348/390 |
| 5,159,447 | 10/1992 | Haskell et al. | 348/419 |
| 5,216,503 | 6/1993 | Paik et al. | 348/390 |
| 5,241,383 | 8/1993 | Chen et al. | 358/136 |

*Primary Examiner*—Michael T. Razavi
*Assistant Examiner*—Jerome Grant, II
*Attorney, Agent, or Firm*—Darleen J. Stockley

[57] ABSTRACT

The present invention is method and apparatus for preventing overflow and underflow of an encoder buffer in a video compression system. A virtual buffer is created in a rate controller to model the decoder buffer fullness (102). A sequence of bits is generated by an encoder (104). The encoder is controlled by the rate controller to prevent a decoder buffer underflow and overflow. Then, the sequence of bits is received by the encoder buffer to produce a bitstream (106). The bitstream corresponds to an instantaneous channel bitrate. The bitstream is transmitted from the encoder buffer to a decoder buffer following a delay (108). The delay is controlled by a rate controller to synchronize an encoder buffer fullness with a virtual buffer fullness (110). The synchronization prevents overflow and underflow of the encoder buffer.

7 Claims, 2 Drawing Sheets

200

300

METHOD AND APPARATUS FOR PREVENTING OVERFLOW AND UNDERFLOW OF AN ENCODER BUFFER IN A VIDEO COMPRESSION SYSTEM

FIELD OF THE INVENTION

The invention relates generally to the field of video compression, and in particular, to the control of an encoder buffer used to store compressed video data.

BACKGROUND OF THE INVENTION

Video systems are known to include a plurality of communication devices and communication channels, which provide the communication medium for the communication devices. For example, the communication channel may be wireline connections or RF frequency carriers. To increase the efficiency of the video system, video that needs to be communicated over the communication medium is digitally compressed. The digital compression reduces the number of bits needed to represent the video while maintaining perceptual quality of the video. The reduction in bits allows more efficient use of channel bandwidth and reduces storage requirements. To achieve digital video compression, each communication device may include an encoder and a decoder. The encoder allows a communication device to compress video before transmission over a communication channel. The decoder enables the communication device to receive and process compressed video from a communication channel. Communication devices that may use digital video compression include high definition television transmitters and receivers, cable television transmitters and receivers, video telephones, computers and portable radios.

Several standards for digital video compression have emerged, including International Telecommunications Union ITU-T Recommendation H.261, the International Standards Organization/International Electrotechnical Committee, ISO/IEC, 11172-2 International Standard, MPEG-1, and the forthcoming ISO/IEC 13818-2 standard, MPEG-2. These standards designate the requirements for a decoder by specifying the syntax of a bit stream that the decoder must decode. This allows some flexibility in the creation of the encoder, but the encoder must be capable of producing a bit stream that meets the specified syntax.

To maximize usage of the available channel bandwidth and the quality of the video, the encoder seeks to match the number of bits it produces to the available channel bandwidth. This is often accomplished by selecting a target number of bits to be used for the representation of a video frame or picture. The target number of bits is referred to as the target bit allocation. The target bit allocation may be substantially different from picture to picture, based upon picture type and other considerations. A further consideration for the encoder in generating bits is the capacity of any buffers in the system. Generally, since the bitrates of the encoder and decoder are not constant, there are buffers placed at both ends of the channel, one following the encoder prior to the channel and one at the end of the channel preceding the decoder. The buffers absorb the fluctuation in bitrates. The encoder often must insure that the buffers at the encoder and decoder will not overflow or underflow as a result of the bit stream generated.

Generally, and in particular in the case of emerging video compression standards, more than one picture type is used for encoding the pictures. For example, MPEG uses intracoded pictures, predicted pictures, and bidirectionally predicted pictures. Intracoded pictures use only the information contained within the current picture itself for encoding. Predicted pictures use the current picture and a previously encoded picture as a reference to encode the current picture. By using the previously encoded picture as a reference, fewer bits are generally generated since only differences between the current picture and the previously encoded picture need to be encoded. Similarly, bidirectionally encoded pictures may use a past and/or previously encoded picture as a reference in addition to the current picture to encode the current picture. The different picture types inherently generate a varying number of bits. Since intracoded pictures do not use a reference picture for creating the current picture, they inherently use more bits than a bidirectionally encoded picture. Also, predicted pictures generally produce more bits than bidirectionally encoded pictures but less bits than intracoded pictures. The different picture types add a level of complexity to the problem of matching the encoder rate to the channel rate since different pictures inherently need to use more or less bits. In addition, the use of different picture types further complicates the control of underflow and overflow of any buffers resident in the system.

Therefore, a need exists for a method and apparatus to prevent overflow and underflow of an encoder buffer in a video compression systems and yet maintain visual quality.

DESCRIPTION OF A PREFERRED EMBODIMENTS

The present invention is method and apparatus for preventing overflow and underflow of an encoder buffer in a video compression system. A virtual buffer is created in a rate controller to model the decoder buffer fullness. A sequence of bits is generated by an encoder. The encoder is controlled by the rate controller to prevent a decoder buffer underflow and overflow. Then, the sequence of bits is received by the encoder buffer to produce a bitstream. The bitstream corresponds to an instantaneous channel bitrate. The bitstream is transmitted from the encoder buffer to a decoder buffer following a delay. The delay is controlled by a rate controller to synchronize an encoder buffer fullness with a virtual buffer fullness. The synchronization prevents overflow and underflow of the encoder buffer.

The compression algorithm scheme of the present invention uses pictures of different types with different statistical properties. In order to maximize the overall encoding picture quality, the number of bits targeted to encode the different picture types is predetermined. This number can be substantially different from picture to picture, based upon picture type and other considerations. To achieve good encoding picture quality, the number of bits generated is kept close to the target bit allocation.

During encoding, a video picture is divided into successive blocks. For example, in MPEG-1 and MPEG-2, each block consists of pixels. As each block is encoded, the number of bits generated is tabulated in the virtual buffer, and the bits flow into the encoder buffer. The encoder buffer then outputs bits through a channel into the decoder buffer.

The number of bits generated from block to block generally differ substantially, whereas the number of bits output to the channel is kept constant. The number of bits generated per block is controlled in a relative way by adjusting the amount in which each block is quantized. The exact number of bits generated with a particular quantization step size varies depending upon the picture content, and is not known until after the block has been compressed using the chosen quantization stepsize. However, in general, the higher the quantization stepsize, the fewer the number of bits that are generated.

Figure 1:
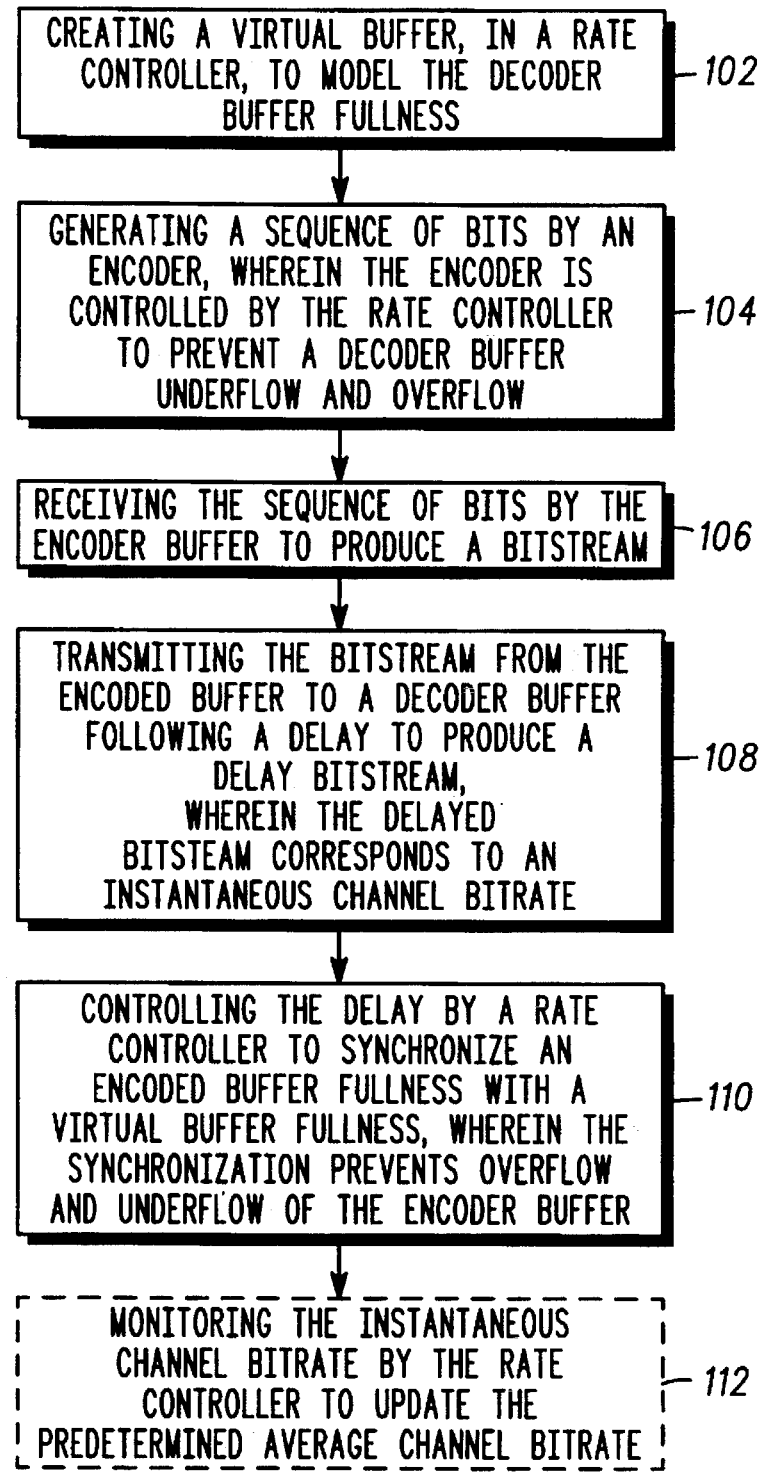
FIG. 1 is a flow diagram of one embodiment of a method for preventing overflow and underflow of an encoder buffer in a video compression system in accordance with the present invention.

The present invention can be more fully described with reference to FIGS. 1–3. FIG. 1, numeral 100, is a flow diagram of a method for preventing overflow and underflow of an encoder buffer in a video compression system in accordance with the present invention. A virtual buffer is created in a rate controller to model the decoder buffer fullness (102). A sequence of bits is generated by an encoder (104). The encoder is controlled by the rate controller to prevent a decoder buffer underflow and overflow. Then, the sequence of bits is received by the encoder buffer to produce a bitstream (106). The bitstream corresponds to an instantaneous channel bitrate. The bitstream is transmitted from the encoder buffer to a decoder buffer following a delay (108). The delay is controlled by the rate controller to synchronize an encoder buffer fullness with a virtual buffer fullness (110). The synchronization prevents overflow and underflow of the encoder buffer.

The encoder buffer is designed to have a larger storage capacity than the decoder buffer. The delay of the switch $\tau$ is determined by:

$$\tau = \left[ \frac{(\beta - B(T^-)) \cdot F}{\overline{R}} \right]$$

where $\beta$ is the predetermined decoder buffer size, $B(T^-)$ is the initial decoder buffer fullness, $\overline{R}$ is the predetermined average channel bitrate, and $F$ is the predetermined frame rate. The instantaneous channel bitrate may be monitored by the rate controller to update the predetermined average channel bitrate.

Figure 2:
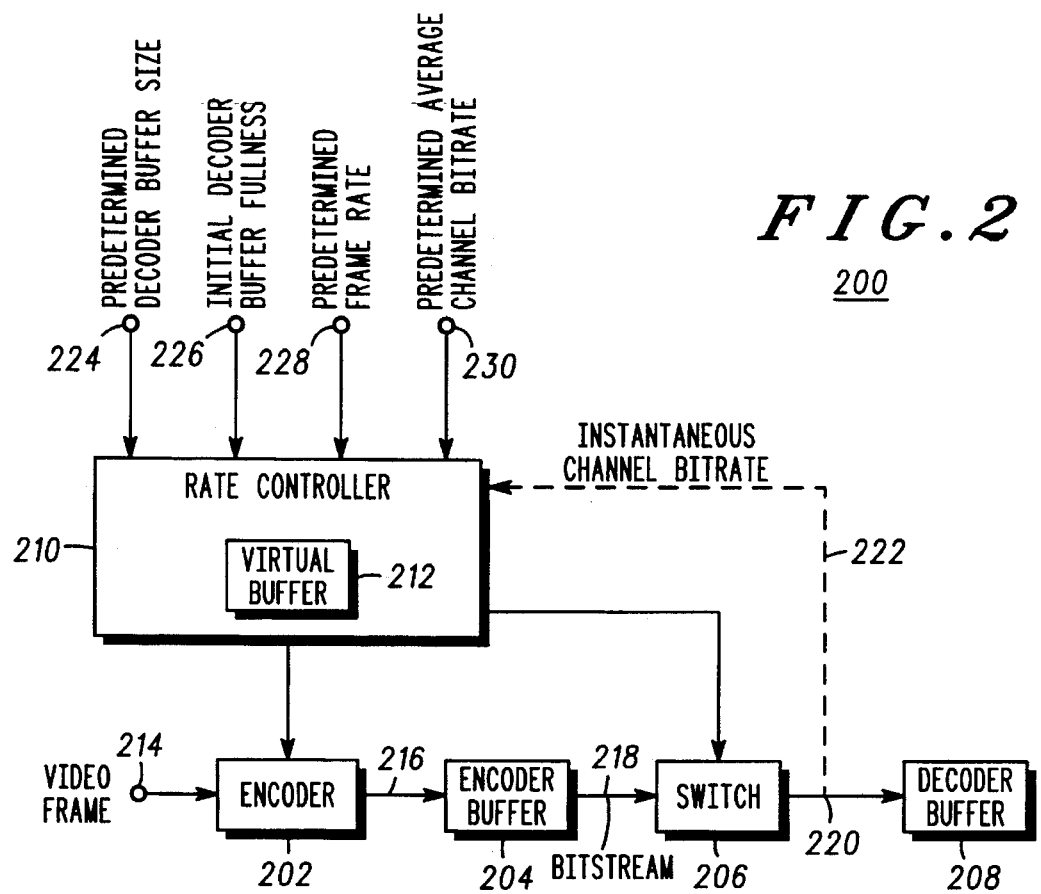
FIG. 2 is a block diagram of one embodiment of an apparatus which contains a rate controller for preventing overflow and underflow of an encoder buffer in a video compression system in accordance with the present invention.

FIG. 2, numeral 200, is a block diagram of an apparatus which contains a rate controller for preventing overflow and underflow of an encoder buffer in a video compression system in accordance with the present invention. The apparatus comprises an encoder (202), an encoder buffer (204), a switch (206), a decoder buffer (208), and a rate controller (210). The rate controller further comprises a virtual buffer (212).

The encoder (202) generates a sequence of bits (216) based on an input video frame (214). The encoder buffer (204) receives the sequence of bits (216) to produce a bitstream (218). The switch (206) delays the transmission of the bitstream (218) to produce a delayed bitstream (220). The delayed bitstream (220) corresponds to an instantaneous channel bitrate (222). The decoder buffer (208) receives the delayed bitstream (220). The rate controller (210) containing the virtual buffer (212) controls the encoder (202) and therefore, prevents the decoder buffer (208) from underflowing and overflowing. The rate controller (210) containing the virtual buffer (212) also controls the delay of the switch (206) to prevent overflow and underflow of the encoder buffer (204).

The encoder buffer is designed to have a larger storage capacity than the decoder buffer. The delay of the switch $\tau$ is determined by:

$$\tau = \left[ \frac{(\beta - B(T^-)) \cdot F}{\overline{R}} \right]$$

where $\beta$ is the predetermined decoder buffer size (224), $B(T^-)$ is the initial decoder buffer fullness (226), $\overline{R}$ is the predetermined average channel bitrate (230), and $F$ is the predetermined frame rate (228). The instantaneous channel bitrate (222) corresponding to the delayed bitstream (220) may be monitored by the rate controller (210) to update the predetermined average channel bitrate (230).

Figure 3:
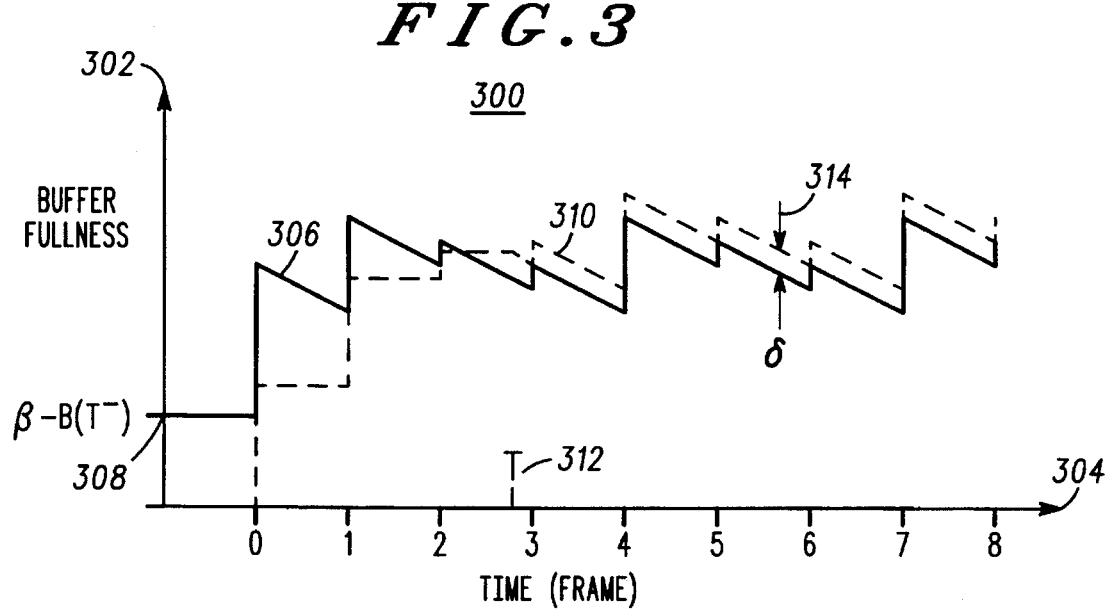
FIG. 3 is a graphical representation of an encoder buffer fullness and a virtual buffer fullness in accordance with the present invention.

FIG. 3, numeral 300, is a graphical representation of an encoder buffer fullness (310) and a virtual buffer fullness (306) in accordance with the present invention. The buffer fullness (302) is displayed as a function of time expressed in frames (304). The difference (308) between the predetermined decoder buffer size (224) and the initial decoder buffer fullness (226) is depicted at time zero and is expressed as:

$$\beta - B(T^-)$$

The difference $\delta$ (314) between the encoder buffer fullness (310) and the virtual buffer fullness (306) is updated by the delay of the switch (206) to match the difference between the encoder buffer storage capacity and the decoder buffer storage capacity.

The present invention provides a robust method for preventing overflow and underflow of an encoder buffer in a video compression system when overflow and underflow of the decoder buffer is prevented. Other methods for rate control such as TM5 of MPEG-2 and SM3 of MPEG-1 do not address overflow and underflow of a buffer.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A method for preventing overflow and underflow of an encoder buffer in a video compression system, the method comprising the steps of:

a) using a virtual buffer, in a rate controller, to model a decoder buffer fullness;

b) generating a sequence of bits by an encoder, wherein the encoder is controlled by the rate controller to prevent a decoder buffer underflow and overflow;

c) receiving the sequence of bits by the encoder buffer to produce a bitstream;

d) transmitting the bitstream from the encoder buffer to a decoder buffer following a delay to produce a delayed bitstream, wherein the delayed bitstream corresponds to an instantaneous channel bitrate; and e) controlling the delay by the rate controller to synchronize an encoder buffer fullness with a virtual buffer fullness, wherein the synchronization prevents overflow and underflow of the encoder buffer, wherein a predetermined encoder buffer size is larger than a predetermined decoder buffer size, wherein the delay is based on the predetermined decoder buffer size, an initial decoder buffer fullness, a predetermined average channel bitrate, and a predetermined frame rate.

2. The method of claim 1, wherein the delay is determined utilizing an equation of a form:

$$\tau = \left[ \frac{(\beta - B(T^-)) \cdot F}{\overline{R}} \right]$$

where $\beta$ is the predetermined decoder buffer size, $B(T^-)$ is the initial decoder buffer fullness, $\overline{R}$ is the predetermined average channel bitrate, and F is the predetermined frame rate.

3. The method of claim 1, wherein the method further comprises monitoring the instantaneous channel bitrate by the rate controller to update the predetermined average channel bitrate.

4. A apparatus for preventing overflow and underflow of an encoder buffer in a video compression system, the apparatus comprising:

an encoder, operably coupled to a rate controller, for generating a sequence of bits based on an input video frame;

the encoder buffer, operably coupled to the encoder, for receiving the sequence of bits to produce a bitstream;

a switch, operably coupled to the encoder buffer and to the rate controller, for providing a delay and preventing the transmission of the bitstream from the encoder buffer to a decoder buffer to produce a delayed bitstream, wherein the delayed bitstream corresponds to an instantaneous channel bitrate;

the decoder buffer, operably coupled to the switch, for receiving the bitstream; and the rate controller, operably coupled to the switch, for controlling the encoder to prevent a decoder buffer underflow and overflow and for controlling the delay of the switch to prevent overflow and underflow of the encoder buffer, wherein a predetermined encoder buffer size is larger than a predetermined decoder buffer size, wherein the delay is based on the predetermined decoder buffer size, an initial decoder buffer fullness, a predetermined average channel bitrate, and a predetermined frame rate.

5. The apparatus of claim 4, wherein the delay is determined utilizing an equation of a form:

$$\tau = \left[ \frac{(\beta - B(T^-)) \cdot F}{\overline{R}} \right]$$

where $\beta$ is the predetermined decoder buffer size, $B(T^-)$ is the initial decoder buffer fullness, $\overline{R}$ is the predetermined average channel bitrate, and F is the predetermined frame rate.

6. The apparatus of claim 4, wherein the instantaneous channel bitrate is monitored by the rate controller to update the predetermined average channel bitrate.

7. The apparatus of claim 4, wherein the rate controller comprises a virtual buffer for modeling a decoder buffer fullness.

* * * * *